United States Patent [19]
Saigh et al.

[11] 3,974,075
[45] Aug. 10, 1976

[54] TOILET SYSTEM

[75] Inventors: Philip A. Saigh, Morton Grove; Albert J. Glueckert, Skokie; Pranas Budininkas, Cicero; Joseph Caldwell, Jr., Lombard, all of Ill.

[73] Assignee: General American Transportation Corporation, Chicago, Ill.

[22] Filed: July 3, 1975

[21] Appl. No.: 593,119

[52] U.S. Cl. .............................. 210/86; 210/104; 210/149; 210/152; 210/181
[51] Int. Cl.² ............................................ C02C 1/00
[58] Field of Search ............ 210/71, 86, 104, 149, 210/152, 181; 4/10

[56] References Cited
UNITED STATES PATENTS

| | | | |
|---|---|---|---|
| 3,642,135 | 2/1972 | Borden | 210/152 X |
| 3,673,614 | 7/1972 | Claunch | 210/152 X |
| 3,700,565 | 10/1972 | Cornish et al. | 210/152 X |
| 3,733,617 | 5/1973 | Bennett | 4/10 |
| 3,821,107 | 6/1974 | Peoples | 210/152 X |
| 3,856,672 | 12/1974 | Boswinkle et al. | 210/71 X |

*Primary Examiner*—John Adee
*Attorney, Agent, or Firm*—Claron N. White

[57] ABSTRACT

The toilet system includes an evaporator tank having an inlet and an outlet that is at the top portion of the tank, a first electrical heater mounted on the tank, macerator/transfer pump means connected to the inlet of the tank to transfer flushed waste from a toilet to that tank, a vapor treatment system including a vessel having an inlet and a vent outlet and containing a bed of catalyst, first conduit means connected to the outlet of the tank and to the inlet of the vessel to transfer vapor from the tank to the vessel, a second electrical heater mounted on the conduit means to heat vapor passing from the tank to the vessel of the vapor treatment system, and second conduit means connected to the first conduit means between the mounting of the second heater and the evaporator tank to introduce pressure air into the vapor from the tank before the heating of the vapor. The toilet system further includes means mounted in one of said first and second conduit means and responsive to a condition indicative of inadequate pressure of air in said second conduit means to prevent continued operation of the second heater. The toilet system has low-level sensing means mounted in the evaporator tank that is operative, when the level of liquid waste in that tank is below a predetermined low level, to prevent the operation of the first heater. Also mounted in the evaporator tank is high-level sensing means that is operative, when the level of liquid waste in the tank has raised to a predetermined higher level to prevent the operation of the macerator/transfer pump means until the level of liquid in the tank is lowered by evaporation of water from the liquid waste in the tank or the discharge of liquid waste from the tank.

17 Claims, 7 Drawing Figures

TOILET SYSTEM

BACKGROUND OF THE INVENTION

1. Field of the Invention

This invention relates to toilet systems that treat flushed human waste from a toilet or urinal and more especially relates to toilet systems that macerate the flushed human waste followed by an evaporation of part of the water content to reduce the volume of waste that is stored until it can be discharged.

2. Description of the Prior Art

Broadly speaking there are two general types, recirculating and nonrecirculating, of toilet systems that receive human body waste.

The recirculating toilet systems are particularly useful on airplanes. For these systems it is necessary to provide initially in a waste-receiving tank a limited amount of flush water. The flushed waste flows into that tank. During each subsequent use filtered water is pumped to the toilet as flush water from the accumulated mixture of initial water and increasing content of human body waste. These recirculating toilet systems minimize the amount of flush water required to be added to the airplane at the start of a period of service of the toilet system in the airplane. Some systems of this type provide a periodic withdrawal from the tank of a part of the accumulated mixture of body waste and initial flushing water to another tank in which it is heated to evaporate part of the water content. The latter systems of this type are disclosed in assignee's U.S. Pat. Nos. 3,535,712 and 3,536,196. In these patents it is disclosed that this evaporation of part of the water content produces a slurry that can be incinerated. In both of these patents the evaporated water content is vented to the atmosphere and it is disclosed that the vapor from the evaporation tank can be passed through a biological filter before venting the water vapor to the atmosphere. The incineration of the slurry to ash after the evaporation can be performed in the same tank when the heated tank etc. are suitably constructed.

In another recirculating toilet system, that is shown in U.S. Pat. No. 3,831,534, the accumulated mixture of initial flush water and human body waste is periodically transferred to an incinerator in which the liquid content is evaporated and discharged and the solids are converted to ash by a combustion flame.

A modified recirculating toilet system is disclosed in U.S. Pat. No. 3,733,617. In that system the human waste is macerated during transfer to a tank from which it is fed to a heated vacuum chamber in which volatile liquid of the waste is evaporated while the solids are withdrawn from the bottom as dehydrated waste. The evaporated liquid is condensed and that liquid is transferred to a vessel from which it is pumped to the toilet for the flushing of the toilet.

U.S. Pat. No. 3,700,565 discloses a toilet system in which the flushed human waste is transferred from a receiving tank to an evaporating tank in which the liquid portion of the waste is vaporized by microwave energy. The evaporated water content is vented to the atmosphere.

The nonrecirculating toilet systems are used in facilities including mobile vehicles, such as passenger railroad cars and marine units, that have available a source of flush water that is not limited as is the case for the recirculating toilet systems installed in airplanes. These toilet systems when installed, for example, in passenger railroad cars and marine units, do not have the capability of transferring the flushed human waste to a sanitary sewer system as is the case for those nonrecirculating toilet systems installed in homes. In the past the toilet systems in passenger railroad cars merely dumped the flushed waste along the railroad right-of-way during the travel of the train. In the case of marine units the human waste from toilet systems was dumped overboard without any treatment.

Various systems have been developed to treat the human waste before dumping it. One system, that is illustrated by U.S. Pat. No. 3,846,847, includes means to add a tablet to the flushed waste prior to its maceration. The macerated waste is transferred to a decontamination tank. The tablet provides a chemical decomposition of the waste. The product is dumped. In the marine toilet system of U.S. Pat. No. 3,699,592 flushed human waste is macerated and chemically treated before dumping overboard.

Other patents that disclose toilet systems in which the flushed waste is chemically treated include U.S. Pat. Nos. 3,557,388, 3,563,384 and 3,713,177. U.S. Pat. No. 3,568,215 discloses a toilet system in which the sewage is treated electrolytically and then the treated sewage is reduced in volume by evaporation.

The addition of a chemical tablet or fluid to the flushed waste requires equipment to dispense the chemical during the transfer operation and it is necessary to ensure that the supply has not been depleted. Chlorination has been used to destroy bacteria prior to discharging the macerated flushed waste from the toilet system. The chlorination is not totally effective for the treatment of human waste containing solids and it does not necessarily kill the spores and viruses. Of course, it is desirable to avoid handling of chlorine tanks for their connection into a toilet system for treating flushed human waste.

Instead of a chemical treatment of the entire flushed waste the toilet system described in U.S. Pat. No. 3,548,421 provides a separation of the flushed waste to provide a solid waste matter that is incinerated and a liquid that is subjected to a chemical treatment. In toilet system of U.S. Pat. No. 2,768,386 the flushed waste is homogenized and then transferred to an incinerator in which the liquid content is volatized and discharged to the atmosphere and the solids are incinerated in the same operation.

Assignee's U.S. Pat. No. 3,787,901 claims a toilet system in which the flushed human waste is macerated and then transferred to a storage tank in which the macerated waste is heated to evaporate water for a volume reduction of the waste. In the system of this patent the water vapor is disclosed as merely vented to the atmosphere from the evaporator tank. In the event that it is desired to treat the resultant concentrated flushed waste at the site of the toilet system, the toilet system further includes an incinerator to which the concentrated flushed waste is transferred for its conversion to gas and solids.

As seen below, the toilet system of the present invention includes a catalytic oxidation treatment of the vapor evolved from heated flushed waste in an evaporator tank. U.S. Pat. No. 3,487,016 discloses a method of purifying waste water by catalytic oxidation. Organic and inorganic materials in the liquid or vapor phase are catalytically oxidized using oxygen-containing gas and a catalyst such as acid treated $MnO_2$. That patent mentions a number of earlier U.S. patents that describe processes for catalytic oxidation of waste water.

U.S. Pat. No. 3,127,243 describes a process of recovering potable water from flushed human waste. In the apparatus using the process the entire system is at a low pressure, e.g., 60mm.Hg. The waste is heated to volatilize water and some of the other ingredients of the waste. This vapor is mixed with a very small amount of air and the mixture is passed through a high temperature catalytic zone containing platinum and then cooled to condense water. The test data indicate that a catalytic treatment at a temperature of about 500° C. is required to provide condensed potable water.

A jacketed tank has been used to heat, by steam in the jacket chamber, various foods containing water to provide canned soups etc. One tank construction that is commercially available is used as the preferred evaporator tank in the present invention. That commercial tank includes some, but not all, of the electrical components used in the preferred embodiment of the present invention to control the operation of the heater for the tank. The differences are described below after the detailed description.

Summary of the Invention

The toilet system of the present invention is especially useful for mobile vehicles such as marine units. The present toilet system comprises: an evaporator tank having an inlet, to receive flushed waste from a toilet or a urinal, and an outlet that is at the top portion of the tank; first heater means including a first heater mounted on the tank; a vapor treatment system including a vessel having an inlet and a vent outlet and containing a bed of oxidation catalyst capable of oxidizing at an elevated temperature compounds evaporated with water evaporated from flushed waste; first conduit means connected to the outlet of the tank and the inlet of the vessel to transfer vapor from the tank to the vessel; second conduit means connected to the first conduit means to introduce pressurized air into the vapor between the tank and the vessel for admixture of the air with the vapor; second heater means including a second heater mounted on one of the first and second conduit means to provide to the vessel of the vapor treatment system the admixture of the vapor and the air at an elevated temperature sufficiently high for the oxidation catalyst to provide the air oxidation of the compounds vaporized with water from the tank; high-level sensing means, mounted in the tank, that is operative, when the level of liquid waste in the tank has raised to a predetermined high level; means responsive to a substantial decrease in the rate of heat transfer from the first heater means to liquid waste in the tank due to increased solids content of liquid waste in the tank as a result of the evaporation of water vapor from the tank, and means operative by the concurrent operation of the high-level sensing means and of the responsive means to provide a signal indicating that the level of liquid waste in the evaporator tank is at the predetermined higher level and the rate of heat transfer from the first heater means to the liquid waste has substantially decreased. Preferably the toilet system includes low-level sensing means, mounted in the tank, that is operative, when the level of the liquid waste in that tank is below a predetermined lower level, to cease the operation of the first heater means.

In the preferred embodiment of the toilet system the first heater is a first electrical heater, the second heater is a second electrical heater that is mounted on the first conduit means, and the second conduit means is connected to the first conduit means between the position of mounting of the second electrical heater and the outlet of the evaporator tank.

The toilet system of the invention further includes at least one of means, mounted on the second conduit means, responsive to a drop in air pressure in that conduit means and temperature-sensing means, including a thermal switch, mounted on the first conduit means between the position of mounting of the second electrical heater and the inlet of the vessel of the vapor treatment system. When the air pressure falls below a predetermined pressure, the pressure-responsive means turns off the second electrical heater. When the temperature of air-vapor exceeds a predetermined temperature, the temperature-sensing means turns off the second electrical heater.

In the overall use of the toilet system it further includes macerator/transfer pump means connected to the inlet of the evaporator tank to transfer the flushed waste from a toilet to that tank and the high-level sensing means, when operated, prevents the operation of the macerator/transfer pump means.

The evaporator tank of the toilet system is preferably a jacketed tank in which the jacket surrounds at least the bottom portion of the tank to provide a jacket chamber. In this construction the electrical heater for the evaporator tank is in the lower portion of the jacket chamber and is immersed in a pool of volatizable liquid, such as water, that provides vapor, such as steam, in the upper portion of the jacket chamber to heat the tank and its contents. In the use of this construction of the toilet system the flushed waste is transferred to the evaporator tank after each flushing of the toilet and/or urinal by means of the macerator/transfer pump means.

In the construction using the jacketed tank and heater mounted as described above, the circuitry of the system includes temperature-sensing means, that is mounted in the upper portion of the jacket chamber, and liquid level-sensing means mounted in the bottom portion of that chamber at a higher elevation than the heater in that chamber. This temperature-sensing means has a normally closed contact that opens when the temperature of the vapor in the upper portion of the jacket chamber exceeds a predetermined temperature that is indicative of inadequate rate of heat transfer by the concentrated liquid waste in the tank. This occurs when the solids content of the waste in the tank becomes sufficiently high that the rate of heat transfer is too low. The circuitry of the system has this normally closed contact of the temperature-sensing means in series with a coil of a relay that controls the operation of the heater in the chamber. So long as that contact of the temperature-sensing means is closed and the low-level sensing means operates to indicate that the level of waste in the tank is at least equal to that level, the heater operates.

When the normally closed contact of that temperature-sensing means is opened due to the rise of the temperature of the vapor in the jacket chamber, for the reason mentioned above, the coil is deenergized. This turns off the heater in the jacket chamber. When an additional quantity of flushed water is added to the evaporator tank, the overall solids content decreases. This increases the heat transfer rate. The temperature of the vapor in the jacket chamber decreases sufficiently so that the contact of the temperature-sensing means closes and the heater is again turned on. Thus during the operation of the evaporation of part of the water from a number of quantitites of flushed waste in the evaporator tank, the heater will be off and then on a number of times. For each cycle of heating, the composition becomes one having the poor coefficient of heat transfer.

While the heater is on additional quantities of flushed waste may be added at a rate that the level of liquid material in the tank rises to the elevation at which it operates the high-level sensing means. That high-level sensing means includes a normally closed contact that is opened when the high-level sensing means is operated. That normally closed contact is in circuitry that controls the operation of the macerator/transfer pump means. When that normally closed contact of the high-level sensing means is opened, the macerator/transfer pump means cannot operate to provide more flushed waste to the evaporator tank. When the material at that time in the tank has been reduced in volume by evaporation so that the level of the liquid is below that level-sensing means, the contact closes and the macerator/transfer means will operate when there is a flushing operation.

When the heater in the chamber between the jacket and the tank is turned off by operation of the temperature-sensing means, as described above, the subsequent addition of cooler flushed waste to the tank lowers the solids concentration and the temperature of liquid in the tank. This increases the heat transfer from the vapor in the upper portion of the jacket chamber to the contents of the tank. The temperature of the vapor in the jacket chamber decreases so that the contact of the temperature-sensing means closes. The heater is thereby turned on. This cycling of the operation of the heater occurs as more and more flushed waste is added to the tank and heated for water evaporation to again increase the solids concentration. In the preferred aspect of this construction of the toilet system of the invention, the relay that controls the operation of the heater, as determined by the open or closed condition of the contact of the temperature-sensing means, has a contact that is in series with another contact of the high-level sensing means to provide a signal when two conditions are met, namely, the level of the liquid in the tank is sufficiently high to operate the high-level sensing means and the composition of the material in the tank at that time has a sufficiently high solids content to prevent adequate heat transfer from the vapor in the chamber to the central portion of the material in the tank. The circuitry includes means to maintain this signal as a visual indication that the concentrated material in the tank, as sludge, should be pumped out of the tank before its reuse to evaporate flushed waste.

The system of the invention includes a catalyst in a vessel as described above. The system includes means to introduce air into the vapor from the evaporator tank before passage of that vapor through the bed of catalyst. The temperature of the vapor from the evaporator tank is below that required for a proper oxidation treatment of the materials of the flushed waste that are volatilized with water content in the evaporator tank. In this heating of the flushed waste in the evaporator tank steam is evolved. This evaporated steam volatilizes from the waste many components in the human waste and those that are their thermal degradation and hydrolysis products. This mixture of steam and these steam-volatilizable components of the waste has a variable composition that depends upon many factors. In any event, this mixture contains many malodorous compounds such as mercaptans, sulfides, organic acids, amines, ammonia, and similar compounds associated with the decomposition of human waste.

In view of the fact that such mixture to be catalytically treated, for oxidation of these malodorous compounds, contains mostly water in the form of vapor, it is necessary to prevent the condensation of water in the catalyst bed; otherwise, the effectiveness of the catalyst could be diminished and even destroyed. To avoid this degradation of the catalyst and to provide an adequate temperature of the vapor fed to the catalyst bed, the vapor is heated to a sufficient temperature so that condensation of water in the bed will be avoided. Prior to the heating of the vapor from the evaporator tank the vapor is mixed with air that is introduced into the vapor so that both the vapor from the tank and the air are heated to this required temperature that avoids condensation of water on the catalyst.

In one embodiment of the system of the invention the bottom of the catalyst-containing vessel is at an elevation below the elevation at which the top outlet of the evaporator tank is located. In that embodiment the piping from the tank to the catalyst-containing vessel includes a U-shaped portion that provides an undesirable trap for condensed water. This trap in the piping is avoided if there is sufficient space available to mount the catalyst-containing vessel at a sufficiently higher elevation than that of the outlet of the evaporator tank.

In some installations of the toilet system of the invention there is no space available to mount the catalyst-containing vessel at such higher elevation. In that case the temperature of the catalyst bed and the temperature of the gas passing through the bed is monitored by the presence of the thermal switch in the vent conduit that is connected to the outlet of the catalyst-containing vessel. This thermal switch means has a normally open contact that is in series with the coil of the relay that controls the operation of the heater for the evaporator tank. This normally open contact of the thermal switch means is closed when the gas passing out of the catalyst-containing bed is at least at a predetermined temperature that is sufficiently high to insure that water vapor will not condense in the catalyst bed. Until that normally open contact closes, the gas fed to the catalyst bed is essentially air that is fed to the conduit means that connects the evaporator tank to the catalyst-containing vessel. The heater mounted on that conduit means heats the introduced air to raise the temperature of the catalyst bed until the temperature of the air passing out of that bed is sufficiently high to close the normally open contact of the thermal switch mounted on the vent conduit. When this contact closes, the heater for the evaporator tank is turned on by the operation of the relay having its coil in series with that contact.

In the event that the flow rate of the air into the conduit means between the evaporator tank and the catalyst-containing vessel decreases substantially, due to a drop in the air pressure below a predetermined pressure, the rate of flow of a mixture of air and vapor, from the evaporator tank, passing over the heater in that conduit means will be insufficient to remove heat from the heater and the heater would burn out. To avoid this destruction of the heater, when that air pressure drops below that predetermined pressure, the means to introduce air to the conduit means for admixture of the air with vapor from the evaporator is provided with pressure-sensing means including a normally open pressure switch. When the air pressure provided by this air-introducing means is at a pressure that is at least that of the predetermined pressure, this pressure switch is in the closed position. As a result, when the air pressure drops below that predetermined pressure, this pressure switch opens. It is in the circuit with the coil of a relay that controls the operation of the heater mounted on that conduit means. Thus the opening of the pressure switch shuts off that heater and thereby prevents the burning out of the heater.

In the event that the pressure switch does not open when the air pressure in the air-introducing means falls below the predetermined pressure, the mixture of air and vapor is heated by the heater in the conduit means to a temperature above a predetermined temperature so that the thermal switch means mounted on that conduit means opens its contact to shut off the heater. Thus either the pressure switch or that thermal switch means will shut off the heater to prevent its destruction in the event that the air pressure is inadequate.

In the event that the construction of the toilet system has the catalyst-containing vessel located relative to the evaporator tank so that the piping between them includes the U-shaped portion mentioned above, the system includes the thermal switch means in the vent conduit that is connected to the outlet of the catalyst-containing vessel. In this construction of the toilet system the turning off of the heater in the conduit means between the evaporator tank and the catalyst-containing vessel provides a cooler gaseous mixture emanating from the vessel. When the temperature of the gaseous mixture from the vessel decreases to a temperature below the predetermined temperature, the temperature switch in the vent conduit opens and this shuts off the heater for the evaporator tank. Eventually the evaporator tank cools sufficiently to reduce the vapor pressure in the tank to effectively stop the flow of vapor to the catalyst bed before the catalyst-containing vessel and its catalyst have cooled to a temperature at which water vapor would condense on the catalyst. To resume the operation of the system it is necessary to provide a source of air having the required pressure for an adequate rate of introduction of air into the conduit means between the tank and the catalyst-containing vessel.

DETAILED DESCRIPTION

Figure 1:
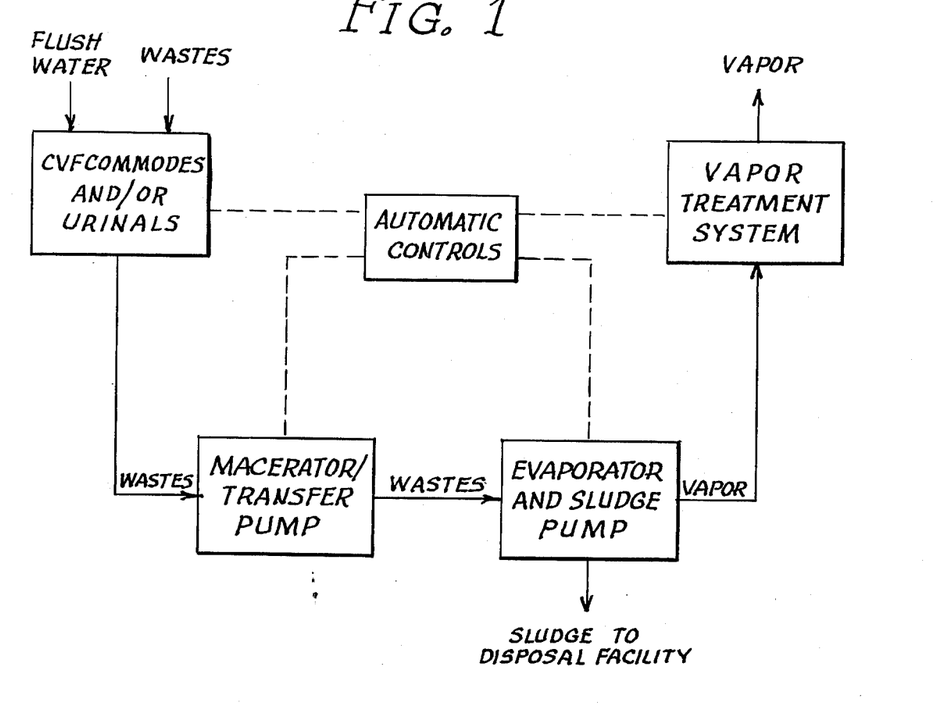
FIG. 1 is a block diagram of the toilet system of the invention.

Referring to FIG. 1, human waste is added to CVF (controlled volume flush) commodes, i.e., toilets, and to urinals. When one of these commodes and urinals is flushed the flushed waste is transferred by a macerator/transfer pump to an evaporator as a part of the flushing operation unless the pump is prevented from operating by the automatic electrical controls described later with respect to FIG. 5.

In the evaporator the flushed waste is heated to remove part of the water content in the form of steam vapor that passes through the vapor treatment system from which the vapor is vented. In the vapor treatment system, compounds in the vapor with steam are catalytically oxidized. After the evaporator has reduced the water content of accumulated quantities of human waste the concentrated waste is transferred by a sludge pump to a disposal facility.

Figure 2:
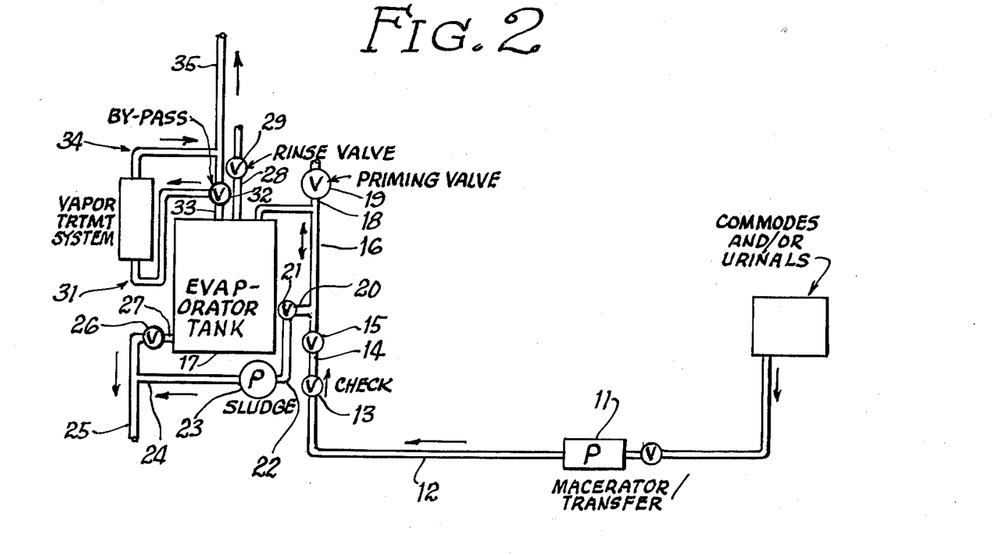
FIG. 2 is a schematic drawing of the toilet system.
Figures 5, 6, 7:
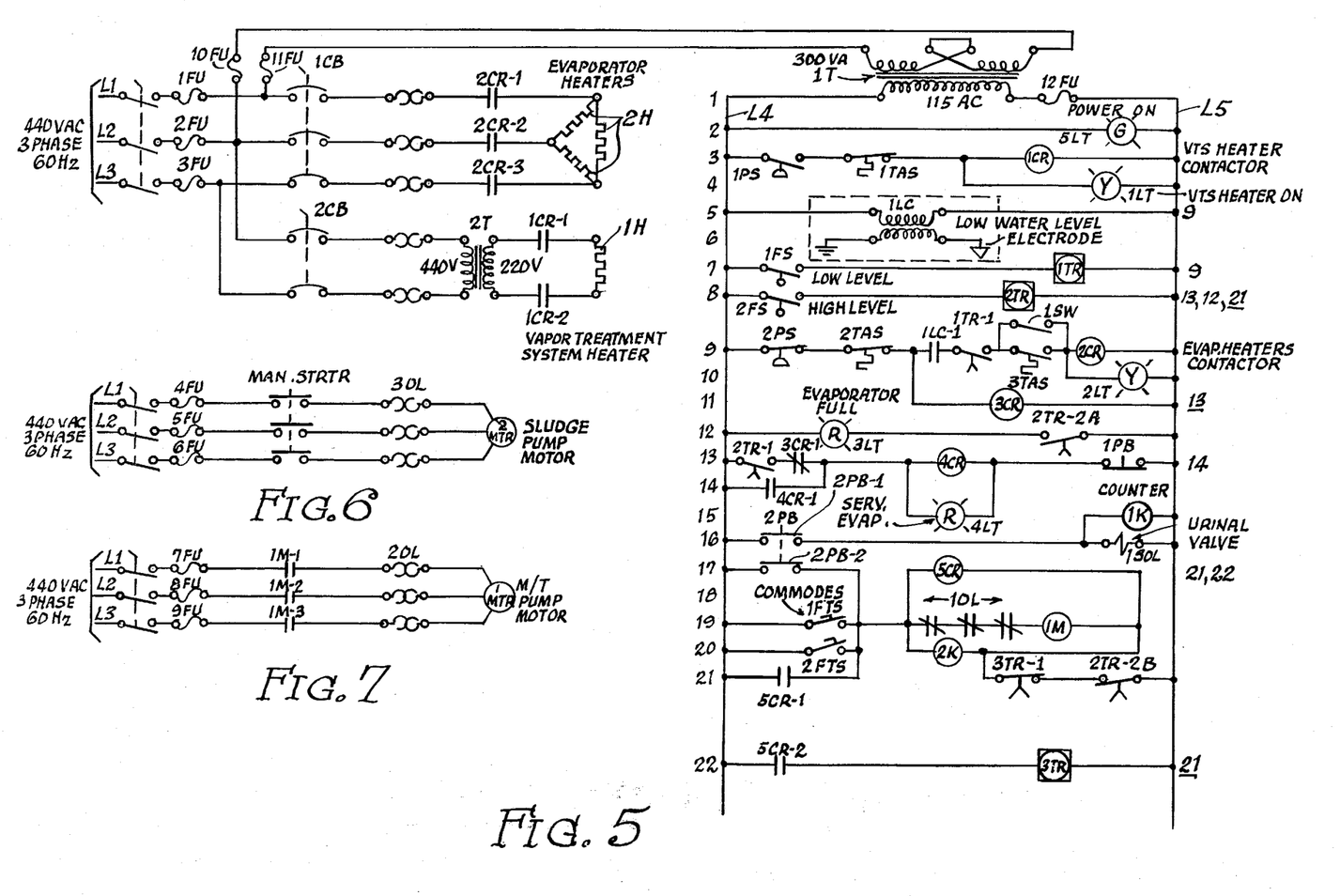
FIG. 5 is an electrical schematic drawing of the preferred embodiment of the electrical control means of the system and the heaters for the evaporator tank and for the vapor treatment system.
FIG. 6 is an electrical schematic drawing of the circuitry to operate the sludge pump motor that is used to pump concentrated waste from the evaporator tank at the completion of a period of the service of the system.
FIG. 7 is an electrical schematic drawing of the circuitry to operate the macerator/transfer pump motor of the system under the control of a relay having its coil shown in FIG. 5.

As seen in FIG. 2 the commodes and/or urinals (not numbered) are connected to a macerator/transfer pump 11 by means of valved conduits (one shown and not numbered). In the use of the system that valve of each conduit is open. Each toilet has a dump valve (not shown) at the bottom of the toilet bowl that is open when a foot pedal (not shown) is depressed and remains open so long as the foot pedal remains depressed. The foot pedal operates a foot pedal switch. The pedal-operated switches for two commodes are shown in FIG. 5. They are switches 1FTS and 2FTS. They are shown as normally open but in the conventional construction they are normally closed switches that are held open by a cam mounted on the foot pedal when the foot pedal is raised. Each pedal-operated switch closes when its associated foot pedal is depressed. When the foot pedal of a toilet is depressed, linkage connected to that foot pedal in a conventional manner mechanically initiates the operation of a conventional flush valve that opens and remains open for a predetermined period of time whether the foot pedal remains depressed or is allowed to return to its raised position. This flush valve, while open, provides a limited amount of flush water to the toilet bowl. The closing of the pedal-operated switch initiates the operation of macerator/transfer pump 11 and its operation continues for a predetermined period of time that is determined by a part of the circuitry shown in FIG. 5 and described later.

The outlet of macerator/transfer pump 11 is connected by a conduit 12 to a check valve 13 that is connected by a pipe 14 to a valve 15 that is usually open. The valve 15 is connected by a conduit 16 that is connected to an inlet of an evaporator tank 17 to transfer flushed waste from pump 11 to the tank. A priming conduit is connected to conduit 16 between valve 15 and evaporator tank 17. A valve 19 is connected to priming conduit 18 and to a source of rinse water. The valve 19 is usually closed. It is opened and valve 15 is closed when concentrated waste, i.e., sludge, is to be removed from evaporator tank 17 at the completion of a period of service use of the system. A conduit 20, a valve 21 and a conduit 22 connect a sludge pump 23 to conduit 16. The valve 21 is opened when valve 19 is opened. The outlet of sludge pump 23 is connected by a conduit 24 to a drain conduit 25 that is connected by a valve 26 and a conduit 27 to the bottom of evaporator tank 17. The valve 26 is usually closed. It is only open when the evaporator tank is rinsed. A rinse conduit 28 is connected to evaporator tank 17 and through a valve 29 to a source of rinse water. The valve 29 is opened only when it is desired to rinse evaporator tank 17. At that time valve 26 is opened.

The inlet of a catalyst-containing vessel 30 (FIG. 4) is connected to evaporator tank 17 by conduit means generally indicated at 31, a 3-way valve 32 and a conduit 33. Vent conduit means generally indicated at 34 is connected to the outlet of vessel 30 of the vapor treatment system. The other end of conduit means 34 is connected to a vent pipe 35 adjacent its end that is connected to valve 32. By this construction evaporator tank 17 can communicate alternatively with the vapor treatment system or with vent pipe 35. In the normal use of the system the rotor of valve 32 is positioned to provide communication between tank 17 and the vapor treatment system.

Figure 4:
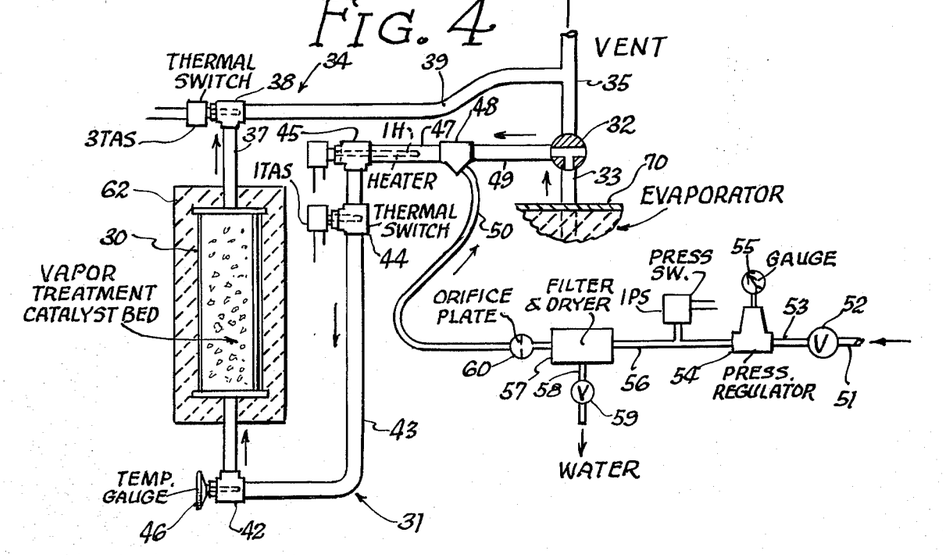
FIG. 4 is a drawing, partially in cross section, of the preferred embodiment of the vapor treatment system and showing its connection to the outlet of the evaporator tank.

As seen in FIG. 4, conduit means 34 includes a conduit 37, that is connected to one of its ends to vessel 30, a coupling 38 connected to the other end of conduit 37, and a conduit 39 connecting coupling 38 to pipe 35. A thermal switch 3TAS is mounted on coupling 38 to monitor the temperature of gas passing from vessel 30 to vent pipe 35.

As seen also in FIG. 4, conduit means 31 includes a conduit 41, that is connected to the inlet of vessel 30, a coupling 42 connected to the other end of conduit 41, a conduit 43 connected to coupling 42 and to a coupling 44 that is connected by a conduit (not numbered) to a coupling 45. Mounted on coupling 42 is a temperature gauge 46 for visual observation of the temperature of the vapor-air passing into vessel 30. Mounted on coupling 44 is a normally closed thermal switch 1TAS that is opened when the temperature exceeds a predetermined temperature. Mounted on coupling 45 is a heater 1H that extends through coupling 45 into a conduit 47 that connects coupling 45 to a coupling 48. One outlet of valve 32 is connected by a conduit 49 to coupling 48 to pass vapor from evaporator tank 17 to conduit 47 in which it is heated by heater 1H. Also attached to coupling 48 is a tubing 50 that feeds pressurized air to coupling 48 in which it mixes with any vapor from tank 17 before passage over heater 1H and ultimate passage through the bed of catalyst in vessel 30.

The pressurized air is provided to tubing 50 from a pressurized air source (not shown) that passes through a pipe 51, valve 52, and a pipe 53 to pressure regulator 54 that provides at its outlet pressurized air of lower pressure than that of the pressure source. An air pressure gauge 55 is mounted on pressure regulator 54 to indicate the pressure of the air supply from regulator 54. This outlet of pressure regulator 54 is connected by a pipe 56 to a filter and dryer 57 from which separated water is periodically removed by a drain line 58 connected to a valve 59. A normally open switch 1PS is connected to pipe 56. The switch 1PS is closed only when the air pressure in pipe 56 is at least a predetermined pressure. The outlet of filter and dryer 57 is connected to tubing 59 through an orifice plate coupling 60.

The vessel 30 contains a catalyst and vessel 30 is surrounded by heat insulation 62.

Figure 3:
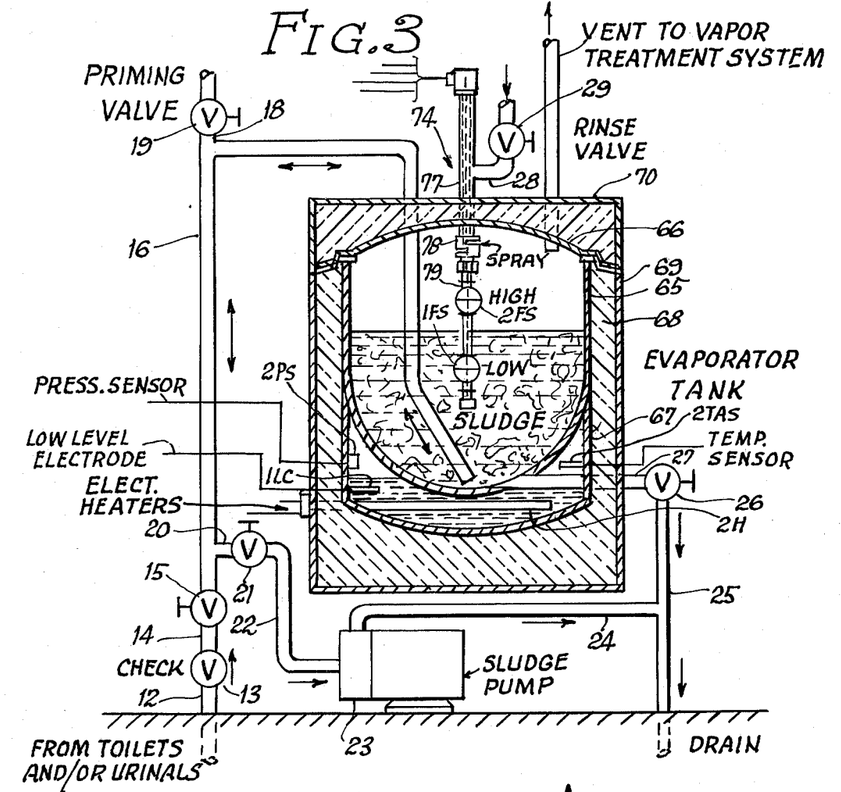
FIG. 3 is a drawing, partially in cross section, of the preferred embodiment of the evaporator tank and associated equipment.

Referring to FIG. 3, evaporator tank 17, in the preferred embodiment, includes an open top vessel 65 having a bottom portion that is hemispherical. The top of vessel 65 is closed by a cover 66 that is secured on vessel 65 to provide a closed chamber. The bottom portion of vessel 65 is enclosed by a jacket 67 that provides a jacket chamber between this portion of vessel 65 of tank 17 and jacket 67. This assembly of jacket 67, vessel 65 and cover 66 is surrounded by insulation 68 within a bottom shroud 69 and a top shroud 70.

The bottom portion of the jacket chamber contains at one elevation electric heaters 2H. In the use of the toilet system in this preferred embodiment the vaporizable liquid in the jacket chamber is described with reference to the preferred liquid, namely, water. At an elevation in the jacket chamber that is at least slightly above electric heaters 2H there is mounted an electrode of a liquid level sensor 1LC. The electrode must be contacted by the pool of water in the jacket chamber to permit the operation of heaters 2H. This control of heaters 2H is described later in connection with FIG. 5. This electrode is in the lower portion of the jacket chamber and is located, as described above, to be in the pool of water in that bottom portion so that heaters 2H are immersed in the water when the electrode is contacted by the water.

In the upper portion of the jacket chamber the pressure and the temperature of the steam, from the heated pool of liquid, are monitored by a normally closed pressure switch 2PS and by a temperature-sensing means comprising a normally closed thermal switch 2TAS. The pressure switch 2PS is only open when the steam pressure in the jacket chamber exceeds a predetermined pressure. The pressure switch 2PS is merely a safety switch for this part of the system. The thermal switch 2TAS opens during the use of the system whenever the temperature of the steam in the jacket chamber reaches a predetermined temperature that indicates that the rate of heat transfer to the liquid waste in tank 17 is less than the normal rate of heat transfer. This decreased rate of heat transfer is due to the increase in solids content of the water in tank 17 resulting from the evaporation of part of its water content. When the steam reaches this predetermined temperature, switch 2TAS opens and this shuts off heaters 2H. The manner in which it accomplishes this result is seen below in the description relating to FIG. 5.

As seen in FIG. 3, conduit 27 extends from valve 26 through shroud 69, insulation 68 and jacket 67 to its connection with vessel 65 at an outlet (not numbered) located at the lowermost portion of vessel 65 of tank 17.

The conduit 16 extends through top shroud 70, insulation 68 and cover 66 into vessel 65 of tank 17. The conduit 16 extends into the lowermost portion of vessel 65. Thus flushed human waste from macerator/transfer pump 11 is pumped into this lowermost portion of vessel 65 of tank 17. This bottom outlet of conduit 16 within vessel 65 is located at this elevation because, in this embodiment, pipe 16 is also used to remove sludge at the completion of a period of service use of the toilet system. During this removal of sludge, valve 15 is closed and valve 21 is opened. Before sludge pump 23 is started, valve 19 is opened to provide water to conduits 16 and 22 for the purpose of providing priming water between pump 23 and the lowermost portion of vessel 65 of tank 17. Then valve 19 is closed. The sludge pump 23 is started. It discharges sludge through conduit 24 to drain conduit 25. At the completion of the removal of sludge from vessel 65, sludge pump 23 is stopped, valve 21 is closed and valve 15 is opened.

The toilet system of the invention includes a low-level sensing means and a high-level sensing means that are mounted in vessel 65 of evaporator tank 17. In the preferred embodiment shown in FIG. 3, these low-level sensing means and high-level sensing means comprise normally open switches 1FS and 2FS, respectively, that are mounted at low and high elevations, respectively, in vessel 65 as components of a level-sensor/rinse assembly generally indicated at 74. The pipe 28 is connected by valve 29 to a source (not shown) of rinse water. The pipe 28 is connected to a vertical pipe 77 at the top portion of assembly 74. The bottom end portion of pipe 77 extends through top shroud 70, insulation 68 and cover 66 of tank 17. The bottom end of pipe 77 is connected to a rinse nozzle 78 in the top portion of vessel 65. In addition to pipe 77 and nozzle 78, the level-sensor/rinse assembly 74 includes a pipe 79 that extends downwardly through pipe 77 to an elevation below that at which it supports low-level sensor switch 1FS of assembly 74. The pipe 79 is connected at its top end portion by the top end portion of pipe 77 to which it is connected. The spray nozzle 78 is fixedly mounted at the bottom end of pipe 77 and is suitably constructed to receive rinse water from pipe 77 and spray the water into vessel 65. Of course, pipe 79 passes through nozzle 78 as well as through pipe 77.

The portion of pipe 79, that is below spray nozzle 78, has mounted on it at suitably elevations low-level and high-level sensor switches 1FS and 2FS, respectively. Conventional float globes (not numbered) of float switch means are slidably mounted on this bottom portion of pipe 79 and then ring clamps (not numbered) are fixedly mounted on pipe 79 below and above each of these float globes. The clamp below each of these float globes limits the downward movement by gravity while the clamp above each limits the upward movement of the float globe by floating on or immersed in liquid waste. In each float globe there is fixedly mounted a magnet (not shown) that is raised when the float globe is raised. This upward movement of the magnet causes the closing of the associated switch (1FS or 2FS) mounted on pipe 79.

The combination of the float globe and a switch is commercially available and can be assembled with a normally closed switch and the magnet arranged so that sufficient upward movement of the float globe opens the normally closed switch. In the present case it is assembled so that a normally open switch is closed by the upward movement of the float globe.

The wires (not numbered) connecting the switches 1FS and 2FS extend through pipe 79 to the top end portion of that pipe above pipe 77 and are connected in part of the circuitry as shown in FIG. 5.

Referring to FIG. 5, the three lines L1, L2 and L3, that are connected to a 440 volt alternating current (VAC), 3-phase, 60 Herz electric power source (not shown) are connected through three ganged contacts of a disconnect switch (not numbered) to three fuses, 1FU, 2FU and 3FU. These fuses are connected through a circuit breaker 1CB to normally open contacts 2CR-1, 2CR-2 and 2CR-3 that are connected to three heaters 2H in the manner shown in FIG. 5 to provide 440 volts to each of the heaters when these contacts are closed. That occurs after a delay following the closing of switch 1FS of the low-level sensing means is closed, and other conditions are met as described below for the specific embodiment being described.

The leg (L2 and L3) is connected by a circuit breaker 2CB to the primary of a transformer 2T to provide 220 volts to two normally open contacts 1CR-1 and 1CR-2 that are connected to the ends of heater 1H. These contacts close when the air pressure in conduit in pipe 56 is at least at the predetermined minimum pressure required to close normally open pressure switch 1PS.

The lines L1, L2 and L3 are connected also to a second disconnect switch (not numbered) that has normally open contacts that are closed when the overall toilet system is ready for use. The contacts of this disconnect switch are connected by fuses 4FU, 5FU and 6FU to contacts of a manual starter switch and these contacts are connected through three thermal overload coils 30L to the motor 2MTR of sludge pump 23.

Referring to FIG. 7, the lines L1, L2 and L3 are also connected to the three contacts of a third disconnect switch (not numbered). These contacts are connected through fuses 7FU, 8FU and 9FU to normally open contacts 1M-1, 1M-2 and 1M-3, respectively, that are connected by thermal overload coils 20L to the motor 1MTR of macerator/transfer pump 11. While contacts 1M-1, 1M-2 and 1M-3 are closed, motor 1MTR operates. These contacts are closed when coil 1M of the starter relay having that coil and these contacts is energized as described later.

Referring again to FIG. 5, another leg (L1 and L2) is connected to the primary coil of a 300VA transformer 1T through fuses 10FU and 11FU, that are connected to fuses 1FU and 2FU, respectively. The secondary coil of transformer 1T provides a 115 VAC power source to lines L4 and L5 that are a part of the electrical control system of this embodiment of the toilet system of the invention.

It is seen that lines L4 and L5 are connected to various components as circuits and subcircuits. To the left of line L4 there are numerals. The numeral 1 merely indicates the connection of lines L4 and L5 to transformer 1T. The other numerals designate circuits or one or more different subcircuits connected to line L4 or line L5 to complete circuits. Some subcircuits are in parallel with one or more components of a circuit or a subcircuit and in series with one or more components of that circuit or another subcircuit. To the right of line L5 of FIG. 5 appear numerals that designate the circuits or subcircuits containing contacts affected by those circuits or subcircuits. Circuit 2 merely contains a light 5LT that is lit when voltage is applied to lines L4 and L5. The circuit 3 includes, in series, normally open switch 1PS, normally closed thermal switch 1TAS and the coil 1CR of the relay having contacts 1CR-1 and 1CR-2 (connected to heater 1H).

Subcircuit 4 contains a light 1LT that is in parallel with coil 1CR and is connected to switch 1TAS and line 1L5. The light 1LT is lit, when coil 1CR is energized, to indicate heater 1H is on.

At lines 5 and 6, there is shown the liquid level sensor 1LC connected to lines L4 and L5. When its electrode is in the water in the bottom portion of the jacket chamber of tank 17, sensor 1LC operates to close its normally open contact 1LC-1 shown in circuit 9 described later.

Circuit 7 includes, in series, normally open switch 1FS and a coil 1TR of a timer relay having a normally open, time-closing contact 1TR-1 (circuit 9) that closes after a predetermined time of delay following the energization of coil 1TR.

A circuit 8 includes, in series, normally open switch 2FS and a coil 2TR of a timer relay having normally open, time-closing contacts 2TR-1 (circuit 13) and 2TR-2A (circuit 12) and a normally closed, time-opening contact 2TR-2B (the part of subcircuit 19 that is shown at line 21).

The circuit 9 includes, in series, normally closed pressure switch 2PS, normally closed thermal switch 2TAS, normally open contact 1LC-1, normally open contact 1TR-1, thermal switch 3TAS, and a coil 2CR of the relay having contacts 2CR-1, 2CR-2 and 2CR-3 that are connected to heaters 2H as described earlier. As seen, a switch 1SW is in parallel with switch 3TAS and is connected to contact 1TR-1 and to coil 3CR so that coil 2CR can be energized by closing switch 1SW to operate heaters 2H even though switch 3TAS is open.

The subcircuit 10 contains a light 2LT that is connected to L5 and to switch 3TAS. The light 2LT is thus in parallel with coil 2CR and is lit, when coil 2CR is energized, to indicate that the heat is being applied to tank 17 by heaters 2H.

The subcircuit 11 has a coil 3CR of a relay containing a normally closed contact 3CR-1 (circuit 13). The subcircuit 11 is connected to line L5 and switch 2TAS so that coil 3CR is energized so long as pressure switch 2PS and thermal switch 2TAS are closed.

The circuit 12 includes, in series, a light 3LT and normally open contact 2TR-2A. Thus light 3LT is lit after a delay following the energization of coil 2TR that occurs when switch 2FS closes.

The circuit 13 includes, in series, normally open contact 2TR-1, normally closed contact 3CR-1, a coil 4CR of a relay having a normally open contact 4CR-1, and a normally closed pushbutton switch 1PB. The subcircuit 14 contains contact 4CR-1 in parallel with contacts 2TR-1 and 2CR-1 of circuit 13. The contact 4CR-1 is connected to line L4 and to coil 4CR as well as to a light 4LT (subcircuit 15) that is in parallel with coil 4CR and that is connected to switch 1PB and also to contact 3CR-1.

The circuit 16 includes, in series, a contact 2PB-1 of a pushbutton switch 2PB and a solenoid 1SOL. The contact 2PB-1 is also connected to line L5 by a counter 1K that is in parallel with solenoid 1SOL.

The circuit 19 includes, in series, a normally open pedal-operated switch 1FTS, thermal overload contacts 10L, and coil 1M of the starter relay for motor 1MTR. The coil 1M is connected to line L5 by connection in series with normally closed, time-opening contacts 3TR-1 and 2TR-2B shown at line 21. The pushbutton switch 2PB has a normally open contact 2PB-2 (seen at line 17) connected to line L4 and to thermal overload contacts 10L to provide another circuit. Also in parallel with switch 1FTS is a switch 2FTS of a second toilet and it is also connected to line L4 and thermal overload contacts 10L for another circuit.

In parallel with thermal overload contacts 10L and coil 1M is a coil 5CR that provides another circuit with contact 2PB-2, switch 1FTS or switch 2FTS, so that coil 4CR is energized whenever contacts 3TR-1 and 2TR-2B are both closed. Coil 5CR is a coil of a relay having a normally open contact 5CR-1 that also connects coil 5CR to line L4 to provide a holding circuit for its energization and that maintains the energization of coil 1M and coil 3TR after the opening of contacts 2PB-1, switch 1FTS or switch 2FTS that is merely manually closed for a brief period of time. The relay having coil 5CR has a second normally open contact 5CR-2, in series, in circuit 22 with a coil 3TR of a timer relay having contact 3TR-1. This holding of the energization of coil 5CR and coil 3TR continues until contact 3TR-1 opens. That occurs, after a predetermined delay, following the energization of coil 3TR of the relay having that coil. Then contact 5CR-2 opens and coil 3TR is deenergized.

The contact 2TR-2B is opened, after a delay, following the closing of switch 2FS of the high-level sensing means to energize coil 2TR. As long as coil 2TR remains energized, motor 1MTR cannot operate to transfer waste to evaporator tank 17.

In parallel with coil 5CR and with the combination of thermal overload contacts 10L and coil 1M is a counter 2K that is connected to switches 1FTS and 2FTS and contact 2PB-2 to provide a count each time that motor 1MTR of the macerator-transfer pump is operated. The counter 1K mentioned above provides a separate record each time that pushbutton switch 2PB is operated to close contact 2PB-1 so that counter 1K provides a record of the number of times the urinal has been rinsed and the macerator/transfer pump is operated to transfer flushed waste from the urinal to tank 17.

The following is a description of the use of the preferred embodiment of the toilet system that has been described for the construction in which the catalyst-containing vessel 30 is essentially alongside evaporator tank 17 and thus the system contains the additional control including thermal switch 3TAS mounted on the vent conduit means for that vessel. In that preferred embodiment the tank is constructed with steam jacket 67 and the three electrical components, namely, liquid level sensor 1LC, pressure switch 2PS and temperature switch 2TAS. In this description of use the toilet system is illustratively installed in a marine vessel and the flush water and the rinse water are assumed to be salt water from the ocean. Liquid in evaporator tank 17 will be sloshed due to the motion of the marine vessel. For this reason some of the relays are timer relays to avoid the initiation of certain operations due to faulty signals of liquid level created by this sloshing action of the liquid in evaporator tank 17.

In view of the fact, that the toilet system, in its operation, provides a substantial reduction in volume of flushed waste by evaporation, the toilet system preferably includes a controlled volume flush operation for the toilets and the urinals. Illustratively each flush of a toilet uses 3 pints of flush water and each flush of the urinal uses 1 pint of flush water. Each toilet has, in addition to its foot pedal that operates a cable attached to the associated flush valve, a hand lever for the flush valve. The lever can be operated to initiate the opening of the flush valve for its predetermined period of time to add flush water to the toilet bowl without initiating the operation of motor 1MTR of macerator/transfer pump 11. Before each time that a toilet is used, the hand lever is operated to provide a pool of flush water to the toilet bowl. Because the foot pedal is not then depressed the dump valve, mentioned above, is in the closed position. As a result this quantity of flush water provides a pool of water in the bottom of the bowl.

The volumetric capacity of the evaporator tank is determined by the expected number of uses of the toilets and urinals per day and the number of days that the system can be used before it is required to remove the concentrated liquid from the tank. Other factors that determine the capacity of the system include the evaporator boil-off rate and the salt precipitation rate and/or sludge-accumulation rate. Illustratively, for a crew of 32 persons on a marine vessel the boil-off rate is assumed to be 48 gallons per day. During the evaporation process, solid waste products are accumulated in the evaporator tank. These solid wastes consist of salts (from urine and salt water), fecal matter and paper. For salt water flushing systems the volumetric capacity of the tank is based on the salt and sludge accumulation rates. When the system is used with fresh water as the flush water, the volumetric capacity of the tank can be based on the sludge accumulation rate only. For the installation being described, evaporator tank 17 has a capacity of 80 gallons with a "working" volume of about 65 gallons while the remaining 12 gallons of capacity provides sufficient volume for sloshing etc.

In this illustration using an 80-gallon tank, the low-level float switch 1FS is located so that it will close when about 40 gallons of liquid are in vessel 65 of evaporator tank 17. The high-level float switch 2FS is located at an elevation such that it closes when the volume of liquid in vessel 65 is approximately 65 gallons.

To prepare the toilet system prior to its use, treated water, to which boiler treatment compound has been added until the pH of the water is between about 10.5 and about 11.5, is added to the jacket chamber through a valved pipe (not shown) connected to an inlet (not shown) in jacket 37. The treated water is added until the water level in the chamber is at a desired level at which heaters 2H are immersed and liquid level sensor 1LC has its electrode in this water. The top surface of the water in the jacket chamber is in the lower portion of the chamber and thus is spaced below pressure switch 2PS and thermal switch 2TAS that are in the upper portion of that chamber. While water is being added to the chamber the steam jacket safety valve (not shown) is open, by a manual opening of the valve, to remove displaced air from the jacket chamber.

The rinse valve 29 is opened and rinse water is added to vessel 65 through pipes 28 and 77 and nozzle 78. Sufficient rinse water is added to close low-level float switch 1FS. The power has been turned on so that voltage is applied to lines L4 and L5. When switch 1FS closes, coil 1TR is energized and after the delay of the timer relay having coil 1TR, contact 1TR-1 closes. After the treated water was added to the jacket chamber the electrode of liquid level sensor 1LC was in the pool of water so that contact 1LC-1 closed. The switch 1SW is manually closed. When this is done coil 2CR is energized and thereby contacts 2CR-1, 2CR-2 and 2CR-3 close to turn on heaters 2H.

A pressure gauge (not shown) is mounted on jacket 67. The treated water in the jacket chamber is raised in temperature by heaters 2H until the pressure in the upper portion of that chamber reaches 5 psig or greater. The steam jacket safety valve lever is then raised for a few seconds to vent air and some water vapor from the upper portion of the tank and then that safety valve is closed. The switch 1SW is opened to turn off heaters 2H. After vessel 65 is cooled, that can be accelerated by the addition of more rinse water to it, the pressure gauge mounted on jacket 67 is checked. The gauge then should read between 20 and 30 inches of vacuum. If the gauge reads between 20 and 0 inches, there is air in the jacket chamber and it will have to be vented. This is done by again closing switch 1SW to turn on heaters 2H. The heating is continued until the pressure gauge indicates a pressure above 5 psig. The steam jacket safety valve lever is again raised to open that valve for a few seconds to vent air from the tank and then the valve is closed. The tank 17 is allowed to cool and the gauge is checked again to see that there is no air in the jacket chamber. These steps are repeated, if necessary, until essentially all of the air has been removed from the jacket chamber. Of course, the water level in the jacket chamber is checked each time after the tank is cooled, and, if necessary, additional treated water is added to the jacket chamber.

The thermal switch 2TAS is set so that it will open illustratively at 240° F. The pressure switch 2PS is set so that it will open illustratively at 27 psig. Each of the timer relays having coils 1TR, 2TR and 3TR is set to provide an illustrative 10-second delay after energization of its coil before it closes or opens its contact or contacts, as the case may be. The pressure switch 1PS is set to close when the pressure in pipe 56 is raised to about 13 psig. For the normal operation of the system the pressure in line 56 is illustratively about 20 psig and the air into that line is provided from a pressurized air source that is substantially higher than 20 psig. The thermal switch 1TAS opens when the temperature within conduit 43 at location of thermal switch 1TAS illustratively reaches 500° F. The thermal switch 3TAS is illustratively set to close at 250° F.

As mentioned above the power has been turned on to provide voltage to lines L4 and L5. This was done by closing disconnect switch (FIG. 5) connected to lines L1, L2 and L3 and by closing circuit breaker switches 1CB and 2CB for heaters 2H and 1H, respectively. The disconnect switches for motors 2MTR and 1MTR (FIGS. 6 and 7) are closed. Before any use of the toilets or urinals connected to macerator/transfer pump 11 it is necessary to do several additional things to put the system in operative condition. The valve 52 is opened to provide high pressure air to regulator 54 that is adjusted to provide an air pressure in line 56 that is sufficiently high to close pressure switch 1PS. This air flows through tubing 50. Because pressure switch 1PS is now closed, coil 1CR is energized and thereby contacts 1CR-1 and 1CR-2 close to turn on heater 1H. The air flows from tubing 50 over heater 1H. The heated air passes through vessel 30 and brings it up to the desired temperature.

When rinse water was added to vessel 65 in the amount of about 40 gallons to close low-level float switch 1FS, this energized coil 1TR and after the 10-second delay contact 1TR-1 closed. When sufficient water was added to the jacket chamber the electrode of liquid-level sensor 1LC was operated to close contact 1LC-1. Because contact 1TR-1 is already closed, the closing of switch 1SW energizes coil 2CR. As a result contacts 2CR-1, 2CR-2 and 2CR-3 close to turn on heaters 2H. The switch 1SW is closed before, at or after the start of the feeding of pressurized air to vessel 30. Ultimately, the rinse water in vessel 65 is raised to its boiling temperature and steam passes from it across heater 1H, with air from tubing 50, and this mixture passes through vessel 30. By that time the piping from heater 1H to catalyst-containing vessel 30 and the catalyst in that vessel have been heated sufficiently to avoid water condensation on the catalyst. When the temperature of the air-vapor passing out of vessel 30 is at least 250° F. switch 3TAS closes. Then switch 1SW is opened, but the energization of coil 2CR continues because switch 3TAS is closed. This condition of a sufficiently high temperature of the air-vapor from vessel 30 is indicated by light 2LT remaining lit after switch 1SW is opened. The toilet system is now ready for use.

If the urinal is flushed by operating momentarily pushbutton switch 2PB, contact 2PB-1 is momentarily closed to energize solenoid 1SOL to initiate the flushing of the urinal. At the same time contact 2PB-2 is momentarily closed to energize coils 5CR and 1M. The energization of coil 1M starts motor 1MTR of macerator/transfer pump 11. The energization of coil 5CR closes contact 5CR-1 so that energization of coils 5CR and 1M continue after contact 2PB-2 opens. When the toilet or commode having switch 1FTS or the toilet or commode having switch 2FTS is flushed by the depression of the associated foot pedal, switch 1FTS or 2FTS is closed. As a result, coils 5CR and 1M are energized. These coils remain energized by the closing of contact 5CR-1 even though the foot pedal is released to open switch 1FTS or 2FTS.

In the event that sufficient water of the rinse water initially in tank 17 is evaporated so that the level drops below switch 1FS, before a urinal or toilet is flushed, switch 1FS opens to deenergize coil 1TR whereby contact 1TR-1 opens to deenergize coil 2CR. In that event heaters 2H are thereby turned off. As soon as sufficient flushed water has been received in vessel 65, by using the urinal or toilet, to close switch 1FS, contact 1TR-1 after the 10-second delay closes to energize coil 2CR for a turning on of heaters 2H.

During successive uses of the toilets and urinals the volume of liquid in vessel 65 of tank 17 increases until the level closes high-level switch 2FS, unless the rate of evaporation of water from vessel 65 is greater than the rate of addition of flushed water. As more and more flushed water is added and part of its water content is evaporated, the liquid in vessel 65 increases in concentration of solids and salt from the water used for flushing and of the salt in the rinse water originally added to vessel 65. Ultimately the concentration of solids and salt in the liquid in vessel 65 can become sufficiently great that the rate of heat transfer from the steam in the jacket chamber is reduced to the point that the temperature of the steam in the jacket chamber rises. The thermal switch 2TAS is set to open at 240° F. The temperature of 240° F. is not reached in the upper portion of the jacket chamber, when the solids concentration of the liquid in vessel 65 does not impair adequate heat transfer. However, when the solids concentration is sufficiently high to impair this heat transfer, the temperature in the upper portion of the jacket chamber rises to 240° F. whereby thermal switch 2TAS opens. That switch is in series with coil 2CR as described earlier and this opening of switch 2TAS deenergizes coil 2CR to shut off heaters 2H. After a period of time the temperature in the upper portion of the jacket chamber decreases sufficiently and switch 2TAS closes to turn on heaters 2H. Thereafter, if additional flushed water has not been added to vessel 65 by the flushing operation for the urinal or toilet the temperature in the upper portion of the jacket chamber will rise to again turn off heaters 2H. As a result there can be an on-off cycle of operation of heaters 2H when the solids concentration in the liquid in vessel 65 becomes sufficiently high due to evaporation of water from vessel 65.

Each time that the level of liquid in vessel 65 rises to a level at which it closes high-level switch 2FS for the energization of coil 2TR, there is, after a 10-second delay, the closing of contacts 2TR-2A and 2TR-1 and the opening of contact 2TR-2B. When contact 2TR-2A closes, light 3LT is lit to indicate that vessel 65 is full, i.e., contains liquid up to the level of switch 2FS.

Whenever coil 2CR is energized and thereby heaters 2H are on, coil 3CR is energized whereby contact 3CR-1 is opened. If contact 3CR-1 is open, when contact 2TR-1 closes, coil 4CR is not energized and light 4LT is not lit. Thus the rise in the level of liquid in vessel 65 of tank 17 to the level that closes high-level switch 2FS will not result in the energization of coil 4CR if heaters 2H are on. In that event, the operation of heaters 2H continues to reduce the volume of liquid by evaporating water that is removed and passes as vapor through the vapor treatment system. There comes a time when the amount of added flushed water has been heated, to evaporate part of its water content, until the remaining liquid in vessel 65 has this property of inadequate heat transfer whereby thermal switch 2TAS opens and when the volume of liquid in vessel 65 at that time is at a level that closes high-level switch 2FS. In that case the opening of switch 2TAS deenergizes coil 3CR whereby contact 3CR-1 closes and after the 10-second delay the energization of coil 2TR by the closing of switch 2FS closes contact 2FS closes contact 2TR-1. When both contact 3CR-1 and 2TR-1 are closed, coil 4CR is energized and light 4LT is lit to indicate that the toilet system should be serviced before further use. Even though evaporation continues from this volume of liquid in vessel 65 to the extent that the level falls below high-level switch 2FS so that coil 2TR is deenergized and thereby contact 2TR-1 opens, the energization of coil 4CR continues because it has a holding circuit including contact 4CR-1. Also light 4LT remains lit to indicate the system should be serviced. This holding circuit will drop out whenever the operator decides to cancel this service-needed indication by momentarily opening pushbutton switch 1PB.

Whenever contact 2TR-2B opens, after a delay, following the closing of high-level switch 2FS as described above, it is not possible to energize coil 5CR or coil 1M. The prevention of energizing coil 1M prevents the operation of macerator/transfer pump 11 during this period of time that contact 2TR-2B is open, i.e., during the time that switch 2FS remains closed. Thus when the level of liquid in vessel 65 is at least at the level of high-level switch 2FS the addition of more flushed waste is prevented. It is seen that, in view of this circuitry, pump 11 is prevented from operating whenever the level of liquid in vessel 65 rises to close switch 2FS. This can occur even though heaters 2H remain on. It can occur when heaters 2H are turned off at the time there is also a condition of poor heat transfer to concentrated liquid that causes the opening of thermal switch 2TAS, namely, at the time the evaporator tank should be serviced by pumping the concentrated liquid, i.e., sludge, from vessel 65 to tank 17.

Each time that pump 11 is operated by energization of coil 1M, the energization of coil 5CR also at that time, closes contact 5CR-2 to energize coil 3TR so that, after a 10-second delay, contact 3TR-1 opens. This causes the deenergization of coil 1M to stop pump 11 and deenergizes coil 5CR so that its holding contact 5CR-1 opens. As a result of this combination of circuitry, pump 11 when initiated in its operation continues to operate for a predetermined time that is this illustrative 10 seconds.

Whenever light 4LT is lit, a removal of concentrated liquid or sludge from vessel 65 is indicated. To remove the sludge, priming valve 19 is opened after closing valve 15 and opening valve 21. When valve 19 is opened, priming water is added by line 16 to pump 23. The valve 19 is then closed. The manual starter switch (FIG. 6) is closed whereby sludge pump motor 2MTR of sludge pump 23 operates to pump the sludge from vessel 65. This operation of motor 2MTR requires only a short period of time. Then the manual starter switch is opened. The valve 21 is then closed and valve 29 is opened to provide rinse water to vessel 65 through nozzle 78. After a sufficient quantity of rinse water is thus added, valve 76 is closed and drain valve 26 is opened to drain the water from vessel 65. Then valve 26 is closed. A new 40-gallon quantity of rinse water is then added to vessel 65. When this occurs the rate of heat transfer from the jacket chamber increases to the point that the temperature in the upper portion of the jacket chamber cools sufficiently so that thermal switch 2TAS closes. Because the quantity of added rinse water is sufficient to close low-level switch 1FS, contact 1TR-1, after the 10-second delay following the energization of coil 1TR, closes to again turn on heaters 2H for the start of another period of service use of the toilet system.

So long as contact 2TR-2B is open, macerator/transfer pump 11 cannot operate. The contact 2TR-2B is opened when light 4LT is lit. The light 4LT continues to be lit so long as contact 2TR-1 remains closed. When the sludge is pumped from vessel 65 the level of liquid drops so that switch 2FS opens to deenergize coil 2TR so that contact 2TR-2B closes and pump 11 can operate. However, the time of operation of sludge pump 23 to remove sludge from vessel 65 is relatively brief. During this brief time of operation, valve 15 is closed so that flushed waste is not added to vessel 65 by the operation of pump 11 initiated by the flushing of a toilet.

If a toilet or urinal is flushed during the rinsing operation for vessel 65, flushed waste will not be added to vessel 65 because valve 15 is closed.

In the foregoing description of pumping sludge from evaporator tank 17 it is mentioned that valve 19 is opened to provide priming water to sludge pump 23 through conduits 16 and 22. Of course, if it is not necessary to prime pump 23 valve 19 is not opened. If priming is required, valve 19 is closed as soon as the priming has been accomplished.

In the rinsing operation it has been stated that valve 26 is opened. For an alternative operation conduit 27 is not used and valve 26 is not opened. Instead, pump 23 is operated as described for pumping sludge from tank 17.

In the event that the pressurized air supply is lost or has a reduction in pressure, the rate of flow of gaseous material over heater 1H is reduced. As a result the temperature of thermal switch 1TAS increases to the point that it opens to shut off heater 1H. When this happens the temperature of vapor or air-vapor passing out of vessel 30 decreases to a temperature of less than 250° F. at which thermal switch 3TAS opens. When this happens coil 2CR is deenergized so that heaters 2H are turned off. This reduces and ultimately stops the flow of water vapor from vessel 65 through conduit means 31 to vessel 30. Thereby the collection of condensed water in the U-shaped portion of conduit means 31 is avoided.

The catalyst used in vessel 30 is any one of a number of conventional oxidation catalysts. An illustrative catalyst is hopcalite that is a mixture of oxides of copper, cobalt, manganese and silver, used in gas masks as a catalyzer converting carbon monoxide to carbon dioxide. Another catalyst that is especially preferred is a nickel catalyst of ⅛ inch ceramic cylinders such as the catalyst Ni/601T sold by Harshaw Chemical Company.

The oxidation catalyst can oxidize and remove odor when the temperature of the catalyst is as low as about 275° F. The extent of this oxidation and removal is dependent upon the temperature and the flow rate through the catalyst of the mixture of air and water vapor containing the oxidizable compounds. Furthermore, for the removal of ammonia odor the temperature of the catalyst and, of course, the mixture of air and vapor from the flushed waste, is required to be at least 350° F. and preferably at least 400° F. A temperature substantially above 450° F. is not economical. Accordingly, the preferred catalyst temperature is between 275° F. and about 450° F. and preferably between about 400° F. and about 450° F. The preferred operating conditions are:

| Catalyst Volume: | 1.3 liters for evap. of 1 kg. $H_2O$/hr. |
|---|---|
| Air Flow: | 1300 liters (STP) for 1 kg. $H_2O$ evap. |

When the catalytic oxidation is being performed under the preferred conditions indicated above, the process completely removes odor and further effects a biological and chemical decontamination to the extent that the vapor from catalyst-containing vessel 30, if condensed, virtually meets potable water standards. The extent of decontamination that is obtainable is illustrated in the following analyses of air-vapor after passing through hopcalite at 420° F.:

Air-Vapor Product

| $CO_2$ | 0.1% |
|---|---|
| $SO_2$ | 1 ppm |
| CO | none detected |
| $H_2S$ | none detected |
| Mercaptans | none detected |
| Ammonia | none detected |
| Nitrogen oxides | none detected |

Product Condensate

| pH | 4.8 – 7.0 |
|---|---|
| Conductivity | 51 $\mu$mhos/cm. |
| Turbidity | 0 JTU |
| Residue on evaporation | 10 mg./l. |
| Inorganic carbon | 0 |
| Organic carbon | 9 mg./l. |
| Sulfate | <5 mg./l. |
| Chloride | <2 mg./l. |
| Ammonia | none (<0.2 mg./l. sensitivity of test) |
| Bacteriological | no viable organisms present; MPN for coliform <2.2/100 ml. |

As mentioned earlier, it is not necessary to include thermal switch 3TAS in the system if catalyst-containing vessel 30 is located with respect to evaporator tank 17 so that the piping between vessel 30 and tank 17 allows any condensed water to drain back into tank 17. When switch 3TAS is not present, switch 1SW is the sole connection between contact 1TR-1 and coil 2CR.

Accordingly, to place the system in operation switch 1SW is closed to operate evaporator heaters 2H by the energization of coil 2CR and the closing of contacts 2CR-1, 2CR-2 and 2CR-3. At that time, it is assumed there is sufficient water in the jacket chamber to effectuate the closing of contact 1LC-1 and the level of liquid in vessel 65 is sufficiently high to close float switch 1FS to effectuate the closing of contact 1TR-1. The switch 1SW remains closed until the evaporator tank 17 is to be serviced by pumping out sludge and rinsing vessel 65 of tank 17, as described earlier. Of course, in the event that, during service use, evaporation of water content from flushed waste in tank 65 lowers the level sufficiently so that switch 1FS opens, coil 2CR will be deenergized so that heaters 2H will be turned off.

As mentioned earlier, the preferred embodiment of the system of the invention uses a jacketed tank as evaporator tank 17. This preferred evaporator tank is a commercial product that contains a sensor for the level of water in the lower portion of the jacket chamber of the evaporator tank, namely, liquid level sensor 1LC. To prevent the operation of the evaporator heaters in that lower portion of the jacket chamber in the commercial product, when it is used for the heating of aqueous material such as soup in the tank, this commercial product also includes a pressure switch, herein designated as switch 2PS, and a thermal switch, herein designated as switch 2TAS. As in the present case the pressure switch is primarily a safety switch. The thermal switch in the commercial product of evaporator tank is set to open at a temperature of about 220° F. whereas the thermal switch 2TAS of this preferred embodiment of the system of the present invention is set to open at a higher temperature, illustratively, at 240° F.

In the prior known use of the jacketed vessel it is only necessary to maintain steam in the jacket for a cooking of materials such as soup. The heaters for that use turn on and off in a cyclic manner during the preparation of the soup so as to prevent the contents in the tank exceeding a predetermined temperature during the cooking operation. In the present system the switch 2TAS is set to open at a temperature that will not be reached until the evaporation occurs to the extent that the concentration of solids impairs heat transfer whereby heat cannot be taken away by material in vessel 65 as fast as it is provided by heaters 2H. Of course, in the use of the jacketed tank for making of soup there is essentially no concentration of solids but rather a heating of the water and the solids for a cooking operation.

In the known use of the commercially available jacketed heating tank that is used in the preferred embodiment of the present invention, a low-level switch 1FS and high-level switch 2FS are not present. They are not required. In the system of the present invention, in its preferred embodiment and in its broadest aspect, these switches are present. The switch 1FS is present so that heaters 2H are not turned on unless sufficient liquid has been added initially to vessel 65 prior to a service use. The switch 2FS is present to prevent the addition of more flushed waste when the quantity of liquid in vessel 65 reaches a predetermined maximum level. The closing of switch 2FS also cooperates with the opening of switch 2TAS for a turning off of evaporators 2H that occurs when the rate of heat transfer from the jacketed chamber to the contents of vessel 65 is inadequate. Means responsive to the occurrence of both conditions provides a signal that evaporator tank 17 should be serviced. In the illustrative embodiment this signal turns on light 4LT. The signal is maintained because coil 4CR is energized at the same time that light 4LT is lit and the energization of coil 4CR closes holding contact 4CR-1 so that coil 4CR remains energized and light 4LT continues to be lit even after either switch 1FS or switch 2TAS opens. Of course, the system can be modified to provide an automatic operation for pumping sludge from vessel 65 and a rinsing of vessel 65 in response to the signal that is provided whenever both conditions are met, i.e., contact 2TR-1 is closed and contact 3CR-1 is closed when switch 2TAS opens to deenergize coil 3CR. In such modification for automatic pumping and rinsing of vessel 65 it would not be necessary, of course, to provide the holding contact 4CR-1. Instead, illustratively coil 4CR would be used, when energized, to initiate this automatic servicing operation of removal of sludge by pumping and the subsequent rinsing of vessel 65.

The foregoing description has been presented solely for the purpose of illustration and not by way of limitation of the invention because the latter is limited only by the claims that follow.

We claim:
1. A toilet system which comprises:
an evaporator tank having an inlet, to receive flushed waste from a toilet or a urinal, and an outlet that is at the top portion of said evaporator tank;
first heater means including a first heater mounted on said evaporator tank;
a vapor treatment system including a vessel having an inlet and a vent outlet and containing a bed of oxidation catalyst capable of oxidizing at an elevated temperature compounds evaporated with water evaporated from flushed waste;
first conduit means connected to said outlet of said evaporator tank and said inlet of said vessel to transfer vapor from said evaporator tank to said vessel;
second conduit means connected to said first conduit means to introduce pressurized air into the vapor between said evaporator tank and said vessel for admixture of said air with said vapor;
second heater means including a second heater mounted on one of said first and second conduit means to provide to said vessel of said vapor treatment system the admixture of said vapor and said air at an elevated temperature sufficiently high for said oxidation catalyst to provide said air oxidation of said compounds vaporized with water from said evaporator tank;
high-level sensing means, mounted in said evaporator tank, that is operative, when the level of liquid waste in said evaporator tank has raised to a predetermined high level;
means responsive to a substantial decrease in the rate of heat transfer from said first heater means to liquid waste in said evaporator tank due to increased solids content of liquid waste in said tank as a result of the evaporation of water vapor from said tank; and
means operative by the concurrent operation of said high-level sensing means and of said responsive means to provide a signal indicating that the level of liquid waste in said evaporator tank is at the predetermined higher level and the rate of heat transfer from said first heater means to said liquid waste has substantially decreased.
2. The toilet system of claim 1 wherein:

said first heater is a first electrical heater;
said second heater is a second electrical heater that is mounted on said first conduit means; and
said second conduit means is connected to said first conduit means between the position of mounting of said second electrical heater and said outlet of said evaporator tank,
said toilet system further including means mounted on said second conduit means and responsive to air pressure in said second conduit means, said pressure-responsive means being operative, when the air pressure in said second conduit means falls below a predetermined pressure, to turn off said second electrical heater.

3. The toilet system of claim 2 and further including temperature-sensing means, including a thermal switch mounted on said first conduit means between the position of mounting of said second electrical heater and said inlet of said vessel of said vapor treatment system and responsive, when the temperature of said admixture of air and vapor exceeds a predetermined elevated temperature, to turn off said second electrical heater.

4. The toilet system of claim 2 and further including macerator/transfer pump means connected to said inlet of said evaporator tank to transfer the flushed waste from a toilet to that tank, said high-level sensing means being connected to said macerator/transfer pump means so that, when said high-level sensing means is operated, the operation of said macerator/transfer pump means is prevented.

5. The toilet system of claim 1 wherein:
said first heater is a first electrical heater;
said second heater is a second electrical heater that is mounted on said first conduit means; and
said second conduit means is connected to said first conduit means between the position of mounting of said second electrical heater and said outlet of said evaporator tank,
said toilet system further including temperature-sensing means, including a thermal switch mounted on said first conduit means between the position of mounting of said second electrical heater and said inlet of said vessel of said vapor treatment system and responsive, when the temperature of said admixture of air and vapor exceeds a predetermined elevated temperature to turn off said second electrical heater.

6. The toilet system of claim 5 and further including macerator/transfer pump means connected to said inlet of said evaporator tank to transfer the flushed waste from a toilet to that tank, said high-level sensing means being connected to said macerator/transfer pump means so that, when said high-level sensing means is operated, the operation of said macerator/transfer pump means is prevented.

7. The toilet system of claim 1 and further including temperature-sensing means, including a thermal switch mounted on said vapor treatment system to monitor the temperature of air-vapor after passage through said bed of catalyst in said vessel and responsive, when the temperature of that air-vapor falls below a predetermined elevated temperature, to turn off said first heater means.

8. The toilet system of claim 7 wherein:
said first heater is a first electrical heater;
said second heater is a second electrical heater that is mounted on said first conduit means; and
said second conduit means is connected to said first conduit means between the position of mounting of said second electrical heater and said outlet of said evaporator tank,
said toilet system further including:
means mounted on said second conduit means and responsive to air pressure in said second conduit means, said pressure-responsive means being operative, when the air pressure in said second conduit means falls below a predetermined pressure, to turn off said second electrical heater; and
macerator/transfer pump means connected to said inlet of said evaporator tank to transfer the flushed waste from a toilet to that tank, said high-level sensing means being connected to said macerator/transfer pump means so that, when said high-level sensing means is operated, the operation of said macerator/transfer pump means is prevented.

9. The toilet system of claim 8 and further including second temperature-sensing means, including a thermal switch mounted on said first conduit means between the position of mounting of said second electrical heater and said inlet of said vessel of said vapor treatment system and responsive, when the temperature of said admixture of air and vapor exceeds a predetermined elevated temperature, to turn off said second electrical heater.

10. The toilet system of claim 7 wherein:
said first heater is a first electrical heater;
said second heater is a second electrical heater that is mounted on said first conduit means; and
said second conduit means is connected to said first conduit means between the position of mounting of said second electrical heater and said outlet of said evaporator tank,
said toilet system further including:
second temperature-sensing means, including a thermal switch mounted on said first conduit means between the position of mounting of said second electrical heater and said inlet of said vessel of said vapor treatment system and responsive, when the temperature of said admixture of air and vapor exceeds a predetermined elevated temperature to turn off said second electrical heater; and
macerator/transfer pump means connected to said inlet of said evaporator tank to transfer the flushed waste from a toilet to that tank, said high-level sensing means being connected to said macerator/transfer pump means so that, when said high-level sensing means is operated, the operation of said macerator/transfer pump means is prevented.

11. The toilet system of claim 1 and further including low-level sensing means, mounted in said evaporator tank, that is operative, when the level of said liquid waste in that tank is below a predetermined lower level, to cease the operation of said first heater means.

12. The toilet system of claim 11 wherein:
said first heater is a first electrical heater;
said second heater is a second electrical heater that is mounted on said first conduit means; and
said second conduit means is connected to said first conduit means between the position of mounting of said second electrical heater and said outlet of said evaporator tank,
said toilet system further including:
means mounted on said second conduit means and responsive to air pressure in said second conduit means, said pressure-responsive means being operative, when the air pressure in said second conduit means falls below a predetermined pressure, to turn off said second electrical heater;

temperature-sensing means, including a thermal switch mounted on said first conduit means between the position of mounting of said second electrical heater and said inlet of said vessel of said vapor treatment system and responsive, when the temperature of said admixture of air and vapor exceeds a predetermined elevated temperature, to turn off said second electrical heater; and macerator/transfer pump means connected to said inlet of said evaporator tank to transfer the flushed waste from a toilet to that tank, said high-level sensing means being connected to said macerator/transfer pump means so that, when said high-level sensing means is operated, the operation of said macerator/transfer pump means is prevented.

13. The toilet system of claim 12 and further including:

second temperature-sensing means, including a thermal switch mounted on said vapor treatment system to monitor the temperature of air-vapor after passage through said bed of catalyst in said vessel and responsive, when the temperature of that air-vapor falls below a predetermined elevated temperature, to turn off said first heater means.

14. A toilet system which comprises:

an evaporator tank including:
 a first vessel having an inlet, to receive flushed waste from a toilet or a urinal, and an outlet that is at the top portion of said first vessel; and
 a jacket surrounding at least the bottom portion of said vessel to provide a jacket chamber;

first heater means including a first electrical heater mounted in the bottom part of said chamber;

a vapor treatment system including a second vessel having an inlet and a vent outlet and containing a bed of oxidation catalyst capable of oxidizing at an elevated temperature compounds evaporated with water evaporated from flushed waste;

first conduit means connected to said outlet of said first vessel and said inlet of said second vessel to transfer vapor from said first vessel to said second vessel;

second conduit means connected to said first conduit means to introduce pressurized air into the vapor between said first vessel and said second vessel for admixture of said air with said vapor;

second heater means including a second electrical heater mounted on one of said first and second conduit means to provide to said second vessel the admixture of said vapor and said air at an elevated temperature sufficiently high for said oxidation catalyst to provide said air oxidation of said compounds vaporized with water from said evaporator tank; and electrical means to control and operate said first electrical heater and said second electrical heater, said electrical means including:

high-level sensing means including a normally open float switch mounted in said vessel of said evaporator tank and closed by liquid waste in said vessel of said tank when the level of liquid waste has raised to a predetermined high level;

temperature-sensing means including a normally closed thermal switch mounted in said jacket chamber above its bottom part to sense the temperature of vapor from water heated by said first electrical heater and opened in response to the rise in the temperature of said vapor to a predetermined elevated temperature that is reached when there is a substantial decrease in the rate of heat transfer from the vapor to liquid waste in said first vessel due to increased solids content of liquid waste in said tank as a result of the evaporation of water vapor from said first vessel; and means responsive to the concurrent closing of said float switch and the opening of said thermal switch to provide a signal indicating that the level of liquid waste in said evaporator tank is at the predetermined high level and the rate of heat transfer from said first heater means to said liquid waste has substantially decreased.

15. The toilet system of claim 14 wherein:

said second electrical heater is mounted on said first conduit means; and said second conduit means is connected to said first conduit means between the position of mounting of said second electrical heater and said outlet of said first vessel, said toilet system further including:

means mounted on said second conduit means and responsive to air pressure in said second conduit means, said pressure-responsive means being operative, when the air pressure in said conduit means falls below a predetermined pressure, to turn off said second electrical heater;

second temperature-sensing means, including a second normally closed thermal switch mounted on said first conduit means between the position of mounting of said second electrical heater and said inlet of said vessel of said vapor treatment system and opened in response to the temperature of said admixture of air and vapor exceeding a predetermined elevated temperature, said second temperature-sensing means being operatively connected to said second electrical heater to turn off that heater when said second thermal switch is opened; and macerator/transfer pump means connected to said inlet of said evaporator tank to transfer the flushed waste from a toilet to that tank, said high-level sensing means being operatively connected to said macerator/transfer pump means so that, when said float switch of said high-level sensing means is closed, the operation of said macerator/transfer pump means is prevented.

16. The toilet system of claim 15 and further including third temperature-sensing means, including a thermal switch mounted on said vapor treatment system to monitor the temperature of air-vapor after passage through said bed of catalyst in said second vessel and responsive, when the temperature of that air-vapor falls below a predetermined elevated temperature, to turn off said first heater means.

17. The toilet system of claim 16 and further including low-level sensing means including a second normally open float switch mounted in said first vessel, and closed by liquid waste in said first vessel when the level of liquid waste is raised to a predetermined lower level, said low-level sensing means being operatively connected to said first heater means to prevent the operation of said first heater means when said second float switch is open.

* * * * *

UNITED STATES PATENT AND TRADEMARK OFFICE
CERTIFICATE OF CORRECTION

PATENT NO. : 3,974,075
DATED : August 10, 1976
INVENTOR(S) : Philip A. Saigh et al.

It is certified that error appears in the above-identified patent and that said Letters Patent are hereby corrected as shown below:

Column 20, line 9, "of" should read --on--.
Line 10, "Ni/601T" should read --Ni1601T--.

Signed and Sealed this

Twelfth Day of October 1976

[SEAL]

Attest:

RUTH C. MASON
Attesting Officer

C. MARSHALL DANN
Commissioner of Patents and Trademarks